No. 697,137. Patented Apr. 8, 1902.
W. L. FRISBIE.
LAWN RAKE.
(Application filed Aug. 15, 1900.)
(No Model.)
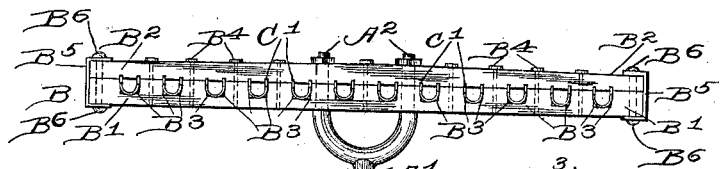
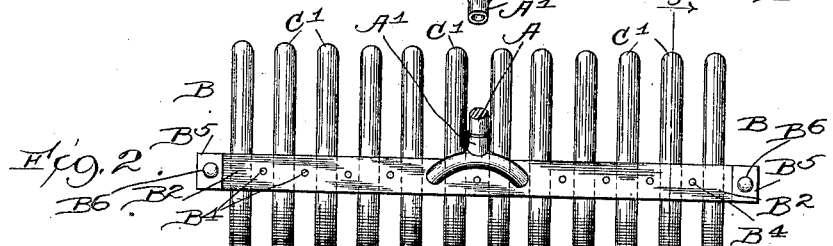
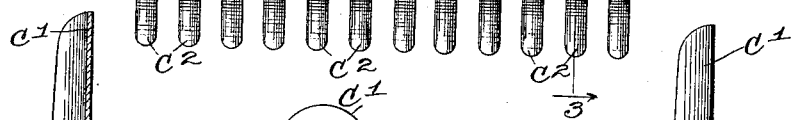
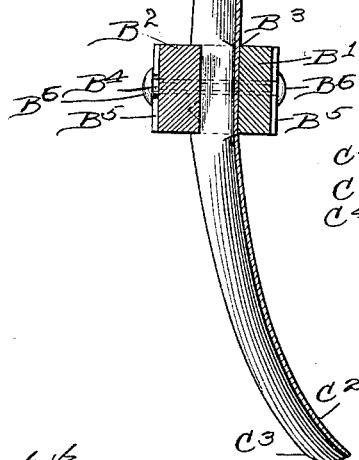
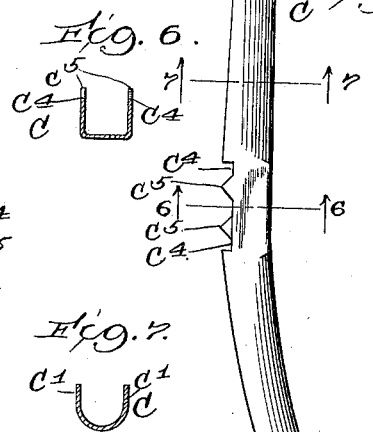
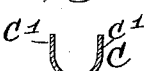
Witnesses:
Ray White
Henry R. White
Inventor:
William L. Frisbie
By Luther L. Miller
Attorney
THE NORRIS PETERS CO., PHOTO-LITHO., WASHINGTON, D. C.

UNITED STATES PATENT OFFICE.

WILLIAM L. FRISBIE, OF RACINE, WISCONSIN, ASSIGNOR TO L. B. BAKER MANUFACTURING COMPANY, OF RACINE, WISCONSIN.

LAWN-RAKE.

SPECIFICATION forming part of Letters Patent No. 697,137, dated April 8, 1902.

Application filed August 15, 1900. Serial No. 26,935. (No model.)

*To all whom it may concern:*

Be it known that I, WILLIAM L. FRISBIE, a citizen of the United States, residing at Racine, in the county of Racine and State of Wisconsin, have invented certain new and useful Improvements in Lawn-Rakes, of which the following is a specification.

The object of this invention is the production of a light strong rake particularly adapted for lawn use.

Lawn-rakes as heretofore generally constructed are provided with teeth of wood or wire which are lacking in strength and stiffness. The rake herein shown and described and which embodies the features of this invention has teeth of sheet metal cut as "blanks" from a flat sheet and afterward pressed into semitubular or U form and curved slightly forward at one end. The teeth thus formed are secured in a rake-head by being clamped about midway of their length between two bars, said teeth projecting from one side of the head as straight teeth and from the other side curving slightly forward at their outer ends.

In the accompanying drawings, Figure 1 is a plan view of a rake-head embodying my invention. Fig. 2 is a front elevation of the same. Fig. 3 is an enlarged transverse vertical section on dotted line 3 3 of Fig. 2, showing the parts in full size. Fig. 4 is a plan view of a rake-tooth blank cut from sheet metal. Fig. 5 is a side elevation of one of said rake-teeth. Fig. 6 is a transverse section on dotted line 6 6 of Fig. 5. Fig. 7 is a transverse section on dotted line 7 7 of Fig. 5.

Like letters of reference indicate corresponding parts throughout the several views.

In the construction of this rake I provide the usual handle A and socket A', the latter secured to the rake-head in any suitable manner, in this instance by the stems $A^2$, passing through the members of the rake-head.

B is the rake-head, comprising two longitudinal wooden pieces B' and $B^2$, the former being provided with the transverse rectangular depressions $B^3$ for the reception of the teeth, to be later described, and the latter being a straight strip of wood secured to the former by nails $B^4$ between the teeth and by the metallic binding-strips $B^5$ at its ends, having the rivets $B^6$.

The teeth C for this rake are cut from sheet metal, being after the first operation in the form of the blank shown at Fig. 4, and later are bent in semitubular or U shape, as shown in Figs. 6 and 7. This cutting and bending is done with dies in the usual manner. One end C' of each tooth is straight, the opposite end $C^2$ inclined forward, the latter being provided with a heel portion $C^3$, upon which the weight of the rake rests as it is drawn over the sod. At the longitudinal center between the ends C' and $C^2$ the forward side of the tooth is of rectangular form to correspond with that of the depression $B^3$ in the member B' of the rake-head B, and the rear edges of each tooth are provided with the notches $C^4$, and each edge within said notches with a projecting tang or point $C^5$. The longitudinal member $B^2$ of the rake-head B is of a width corresponding with that of the notch $C^4$ and is intended to lie within said notch when the rake is finished, the tangs $C^5$ embedding themselves within the wood of the member $B^2$.

The conformation of the teeth C gives them lightness and strength, and while they are here shown in semitubular form it is clear that my invention covers angular teeth and other modifications of the form shown.

The curved tooth end $C^2$ is adapted to ride upon its heel portion $C^3$, raising the point from the ground and overcoming the tendency of the points of the teeth to tear up the grass-roots. The teeth ends C' on the opposite side of the head B being straight are better adapted for garden-raking.

I claim as my invention—

1. In a rake, in combination, a rake-head comprising two longitudinal bars, one of which bars has transverse depressions for receiving the rake-teeth; means for securing the bars together; and a rake-tooth for each of said depressions, which tooth has a notch formed in its rear side in which the other of said longitudinal bars of the rake-head is adapted to lie.

2. In a rake, in combination, a rake-head comprising two longitudinal bars, one of which bars has transverse depressions for receiving the rake-teeth; means for securing the bars together; and a rake-tooth of hollow construction for each of said depressions, which tooth is formed from a piece of sheet material bent to provide a convex face and a concave rear side of said tooth, and has notches formed in the edges at its concave rear side in which the other of said longitudinal bars of the rake-head is adapted to lie.

3. In a rake, in combination, a rake-head comprising two longitudinal bars, one of which bars has transverse depressions for receiving the rake-teeth; means for securing the bars together; and a rake-tooth of hollow construction, for each of said depressions, which tooth is formed from a piece of sheet material bent to provide a convex face and a concave rear side of said tooth, the rear edges of said tooth being provided with a projection for being embedded in one of the longitudinal bars of the rake-head.

4. In a rake, in combination, a rake-head comprising two longitudinal bars, one of which bars has transverse depressions for receiving the rake-teeth; means for securing the bars together; and a rake-tooth of hollow construction, for each of said depressions, which tooth is formed from a blank of sheet metal, having two notches cut in its opposite sides and a projection in each of said notches, which blank is bent to provide a convex face and a concave rear side of said tooth.

5. As a new article of manufacture, a rake-tooth formed from a piece of sheet material bent on a line substantially parallel with the longitudinal axis of the tooth, to form a convex face and a concave rear side of said tooth, and having a notch in the rear side of the tooth near the middle thereof, and a projection in said notch.

6. As a new article of manufacture, a rake-tooth formed from a piece of sheet material bent on a line substantially parallel with the longitudinal axis of the tooth, to form a convex face and a concave rear side of said tooth, and having a squared portion near the middle thereof and notches cut in the edges at its concave rear side, which notches are opposite said squared portion.

7. As a new article of manufacture, a rake-tooth formed from a piece of sheet material bent on a line substantially parallel with the longitudinal axis of the tooth, to form a convex face and a concave rear side of said tooth, and having a portion near its middle of substantially rectangular form.

8. As a new article of manufacture, a rake-tooth formed from a piece of sheet material bent on a line substantially parallel with the longitudinal axis of the tooth, to form a convex face and a concave rear side of the tooth, its middle being substantially of rectangular form, having notches cut from its rear edge at said middle point, one end of said tooth being inclined forward from the line of its longitudinal axis.

9. As a new article of manufacture, a rake-tooth formed from a piece of sheet material bent on a line substantially parallel with the longitudinal axis of the tooth, to form a convex face and a concave rear side of said tooth, one end of said tooth being curved forward from its longitudinal axis, and being provided with a heel at the lower end of said curved portion, and with a rectangular middle portion, said tooth also having a notch in each of its rear edges coinciding with said rectangular portion, and a projection in each of said notches.

WILLIAM L. FRISBIE.

Witnesses:
CHARLES GORTON,
H. B. HALL.